Oct. 8, 1957
F. A. McCOLLY
2,808,744
CIRCULAR SAW TOOTH SETTING DEVICE
Filed July 26, 1955
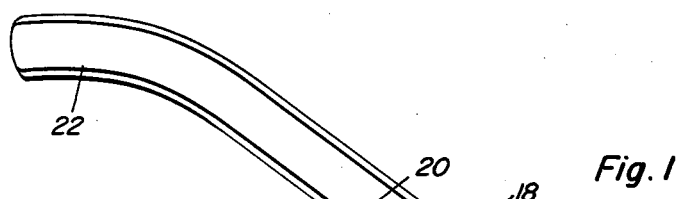
*Fig. 1*
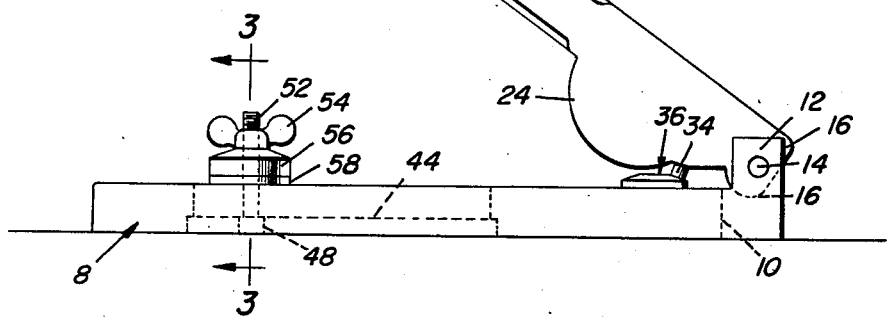
*Fig. 2*
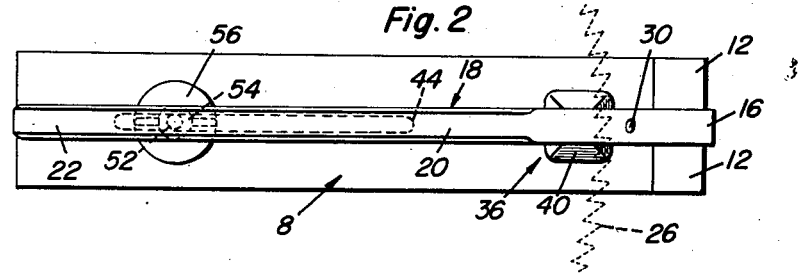
*Fig. 3*
*Fig. 4*
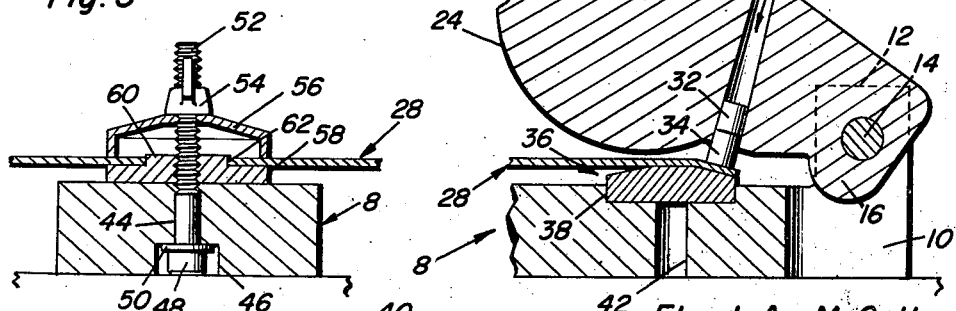
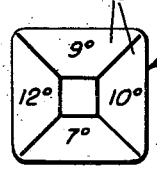
*Fig. 5*
Floyd A. McColly
INVENTOR.
BY *Clarence A.O'Brien*
*and Harvey B. Jackson*
Attorneys ated Oct. 8, 1957

United States Patent Office

2,808,744
CIRCULAR SAW TOOTH SETTING DEVICE

Floyd A. McColly, Fair Oaks, Ind.

Application July 26, 1955, Serial No. 524,317

2 Claims. (Cl. 76—63)

The present invention relates to an improved saw set which is expressly designed and constructed for setting the teeth of a circular saw.

It is an object of the instant concept to aptly and effectually improve upon and reduce the number of elements or parts entering into the over-all combination and to thereby not only increase the efficiency of the structure as a novel entity, but also to render the same less costly to manufacture and to otherwise simplify the ever important factors of expedient assembling, dismantling, repairing and to thus enhance the likelihood of sale compared to rival adaptations.

Keeping in mind that other tests for meritorious circular saw setting devices all have to do, directly or indirectly, with matters of practicality and economy, it is likewise an object of the invention to structurally, functionally and otherwise improve upon similarly constructed and functioning saw sets. To this end the improved adaptation is therefore one which will meet the ordinary manufacturing requirements of manufacturers, similar phases in respect to retailing and what is most important, the needs of the saw user in respect to time-saving and efficient results.

In carrying out a preferred embodiment of the invention a slotted base is provided to accommodate, by way of a slot, a carrier or mount for the hub portion of the saw. This mount, specifically, is of improved construction and will be set forth in detail. Another feature is to have a recess in the base with an insertable and removable anvil and a knock-out hole cooperable therewith to accommodate a knock-out pin. In addition, novelty is predicated on a pivoted lever, the pivoted end portion of which is formed with a segmental enlargement which is in effect a hammer-like weight, whereby an impact pin which is carried to the anvil by the down-swing of the lever is rendered highly effective and both time and energy are thus saved.

Other objects, features and advantages will become more readily apparent from the following description and the accompanying sheet of drawings.

In the drawings, wherein like numerals are employed to designate like parts throughout the views:

Figure 1 is a side elevation of a circular saw set constructed in accordance with the invention.

Figure 2 is a top plan view of the same.

Figure 3 is a section, slightly enlarged on the vertical line 3—3 of Figure 1.

Figure 4 is a fragmentary sectional and elevational view detailing certain structural features.

Figure 5 is a top plan view of the insertable and removable anvil.

Referring now to the drawings it will be noted that the base is a heavy metal elongate part and is denoted, as an entity, by the numeral 8. It has flat top, bottom and marginal side and end surfaces. At one end it is bifurcated or notched as at 10 and a pair of upstanding lugs or furcations 12 thus provided. Supported suitably between the furcations is a hinge or pivot pin 14 and the end portion 16 of the manually actuatable lever 18 is pivoted thereon, as perhaps best shown in Figure 4. This lever has a straight shank portion 20 and a suitably curved and easy-to-hold and readily operable handle portion 22. This lever is as long as the base and in some instances slightly longer. Inwardly of the hinging point and above the base the lever has an increased size which actually comes about by way of increasing the mass of metal and providing a substantially segmental enlargement 24. This is in effect a weight and it helps the user to swing the lever down and in fact imparts sufficient heaviness to bring about a hammer-like blow against the teeth 26 of the saw 28. While further considering this lever and in respect to Figure 4 it will be noticed that there is a tapered passage or bore 30 which extends vertically through the hinged end between the weight 24 and the hinge pin 14. The lower portion of this provides a socket for the tapered upper end 32 of the insertable and removable bending and impact pin 34. Thus when the lever is swung down the pin imparts a hammer-like bending blow on the teeth and this bend is determined by the cooperating surface of anvil 36. The anvil is a simple rectangular block fitting removably into a recess 38 in the top side of the base. The anvil has selectively usable bevels or surfaces 40 and these are marked to indicate the degree of inclination as shown in Figure 5. There is also what may be called a knockout hole 42 provided and this extends upwardly through the base and in axial alignment with the recess and anvil and may be used with a pin (not shown) to drive the anvil out of said recess in case one needs to replace it or turn it for adjustment.

There is a slot on the intermediate portion of the base and this is denoted by the numeral 44, and the lower portion of the slot is increased in width as at 46. This portion of the slot serves to accommodate the head 48 of a bolt and also the washer 50 which is shown in association therewith in Figure 3. The bolt extends upwardly through the main slot 44 where the threaded upper end 52 serves to accommodate a wing nut 54 which is used to position and clamp an inverted cup-like member 56. This presses down and in direct contact with the body of the saw and there is an intervening washer 58 provided here. This washer is interposed between the saw and the top of the base and the washer has an annular boss 60 which accommodates itself to the arbor hole 62 in the saw. This provides a novel mount and carrier for accommodating the saw. Different sized carriers may be used for different saws so that the center of the saw is in the proper position to bring the teeth of the saw above the desired bevelled surface on the anvil. The head 48 is in the groove or slot 46 and preferably has a socket to accommodate an Allen wrench (not shown).

It will be obvious that in practice the saw is mounted and clamped on the carrier means of Figure 3 in the manner illustrated and already described. Hence, the saw is adjustably mounted on the slotted base so that the saw teeth 26 may be properly interrelated and positioned in respect to the bevelled surfaces 40 of the anvil 36. This bending accomplishment is illustrated properly it is believed in Figure 4. Here the observer sees the lever swung down, so to speak, with the hammer-like blow of the lever imparted to the impact pin and the pin bending the tooth against the desired beveled surface of the anvil. It is highly important to keep in mind that this weighted and properly hinged lever brings about the desired hammer-like blow and not only saves time but conserves energy of the user, in an obvious manner.

Since the prior art shows that there are basically similar saw sets having a bearing on the subject matter here it is to be pointed out that the distinctive features have to do with the weighted hammer-like action of the lever and the associated changeable and insertable and removable impact bending pin 34. Specifically, novelty is predicated on the bore 30 with the tapered end 32 of the pin 34 fitting into the bore with the lower portion of the bore serving as a socket.

The means for mounting and clamping the hub portion of the saw blade as depicted in Figure 3 is also highly significant.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A setting device for the teeth of a circular saw comprising a substantially solid elongate steel base, means adjustably and removably mounted on said base for mounting and supporting said saw in a horizontal position above for bending and setting the teeth of said saw, an all-steel lever pivotally mounted at one end for operation toward and from the top of said base, a recess in the top of said base, an anvil removably seated in said recess and having selectively usable teeth setting bevels, a knock-out hole in said base in axial alignment with said recess and adapted to allow a knock-out pin to be passed and driven through said hole in a manner to strike and drive said anvil out of said recess for changing and adjusting at will, that portion of the lower side of said lever directly above said anvil being greatly increased in cross-section and of appreciable added mass and providing a weight which greatly assists in the downward or gravitating stroke of the lever and causes the lever to descend rapidly and bang against the anvil with a hammer-like blow, said lever having a tapered bore occupying a position also above the anvil, said bore being located between the anvil and the pivotal connection existing between the base and anvil, and an impacting and tooth bending pin having its upper end telescopically and drive-fitted into said socket and its lower end situated depending below the lever and movable toward and from the chosen bevel on said anvil.

2. A setting device for the teeth of a circular saw comprising a substantially solid elongate base having a central lengthwise slot opening through the top of the base and having its bottom provided with a groove underlying said slot communicating with a slot and opening through said bottom, means for mounting the hub portion of a circular saw on and above the slotted top of said base and in a horizontal position for teeth setting purposes comprising a bolt having a head confined in said groove and having an upstanding screw threaded shank, said shank extending upwardly through said slot and above the top of the base, a circular washer mounted on said shank and having an upstanding centralized reduced boss to fit into the hub opening in the central portion of the saw, said boss defining an endless encircling ledge supporting the adjacent hub portion of the saw, a centrally apertured inverted cup-like clamp removably mounted on said shank, said clamp being circular in plan and having an outside diameter conformable with that of the washer and adapted to press an intervening portion of the saw against said ledge, a nut carried by said shank and engaging said clamp to press the latter firmly into its clamping state, an all-steel lever pivotally mounted at one end for operation toward and from the top of said base, a recess in the top of said base, an anvil removably seated in said recess and having selectively usable teeth setting bevels, a knock-out hole in said base in axial alignment with said recess and adapted to allow a knock-out pin to be passed and driven through said hole in a manner to strike and drive said anvil out of said recess for changing and adjusting at will, that portion of the lower side of said lever directly above said anvil being greatly increased in cross-section and of appreciable added mass and providing a weight which greatly assists in the downward or gravitating stroke of the lever and causes the lever to descend rapidly and bang against the anvil with a hammer-like blow, said lever having a tapered bore occupying a position also above the anvil, said bore being located between the anvil and the pivotal connection existing between the base and anvil, and an impacting and tooth bending pin having its upper end telescopically and drive-fitted into said socket and its lower end situated depending below the lever and movable toward and from the chosen bevel on said anvil.

References Cited in the file of this patent

UNITED STATES PATENTS

| 120,542 | Shaw | Oct. 31, 1871 |
| 129,249 | Poindexter | July 16, 1872 |
| 153,585 | Lutz | July 28, 1874 |
| 241,633 | Dunn | May 17, 1881 |
| 298,928 | Willey | May 20, 1884 |
| 325,052 | Chamberlin | Aug. 25, 1885 |
| 611,713 | Skersick | Oct. 4, 1898 |
| 655,714 | Kemper et al. | Aug. 14, 1900 |
| 831,693 | Wismar | Sept. 25, 1906 |
| 1,095,865 | Hilsinger | May 5, 1914 |
| 1,188,391 | Becker | June 27, 1916 |
| 1,853,245 | Wardwell | Apr. 12, 1932 |
| 1,909,832 | Jirka | May 16, 1933 |
| 2,634,631 | Mathes | Apr. 14, 1953 |